June 29, 1943.          C. B. ROEDE          2,323,244
SELF-ERECTING MEANS FOR GYROSCOPIC DEVICES
Filed June 17, 1941          2 Sheets-Sheet 1

INVENTOR
CHARLES B. ROEDE
BY Joseph H. Lipschutz
ATTORNEY

June 29, 1943.    C. B. ROEDE    2,323,244
SELF-ERECTING MEANS FOR GYROSCOPIC DEVICES
Filed June 17, 1941    2 Sheets-Sheet 2

INVENTOR.
CHARLES B. ROEDE
BY
Joseph H. Lipschutz
ATTORNEY

Patented June 29, 1943

2,323,244

UNITED STATES PATENT OFFICE 2,323,244

SELF-ERECTING MEANS FOR GYROSCOPIC DEVICES

Charles B. Roede, Ridgefield, N. J., assignor to Sperry Products, Inc., Hoboken, N. J., a corporation of New York Application June 17, 1941, Serial No. 398,386

2 Claims. (Cl. 74—5)

This invention relates to gyroscopic apparatus and particularly to those devices which employ a non-pendulus gyro for the purpose of stabilizing a member in a given plane. Such devices may be directional gyros, artificial horizons, and the like. In all of these devices the gyro is mounted with three degrees of freedom, that is to say, the first degree of freedom is the spinning axis of the gyro within its supporting frame; the second degree of freedom is the pivotal mounting of the gyro supporting frame within a second frame; and the third degree of freedom is the pivotal mounting of the second frame within a fixed support or casing, the pivotal axes of said frames being at an angle to each other. In such an instrument the gyro will stabilize the position of the second or outer frame and the degree of stabilization is dependent upon the angle between the gyro spinning axis and the plane of the outer frame. The maximum stabilization is obtained when the gyro spinning axis is normal to the plane of the outer frame, and the degree of stabilization decreases as said angle decreases. Assuming that an instrument is set up originally so that the gyro spinning axis is normal to the plane of the outer frame, it occurs during operation of such instrument that the gyro becomes tilted out of its original position, due to the rotation of the earth from beneath the gyro, friction in the gyro rotor bearings, and other heterogeneous disturbing forces. As the spinning axis of the gyro tilts with respect to the outer frame, stabilization is decreased until a point is reached where the instrument ceases to function effectively. Therefore, in prior devices auxiliary means have been employed for the purpose of precessing the gyro back to its original and effective position. Such auxiliary means took the form, for instance, of one or more pendulums hung on the apparatus in such way that tilting of the gyro with respect to the pendulous devices caused pressures to be applied around an axis at right angles to the tilting axis of the gyro in order to cause precession of the gyro about its tilting axis in a direction to return the gyro to its original position.

It is the principal object of my invention to provide a gyroscopic device of the type described which will be self-erecting without the necessity of relying upon such auxiliary devices as pendulums and the like, and without producing such forces as will cause precession of the gyro in azimuth. For this purpose I utilize the fact that these devices are usually air-driven and I cause relative movement between the gyro supporting frame and the outer frame caused by tilting of the gyro to control this fluid supply in such manner as to yield torques around the pivotal axis of the outer frame in such direction as to cause precession of the gyro toward its original position.

Further objects and advantages of this invention will become apparent in the following detailed description thereof.

In the accompanying drawings.

Figure 1:
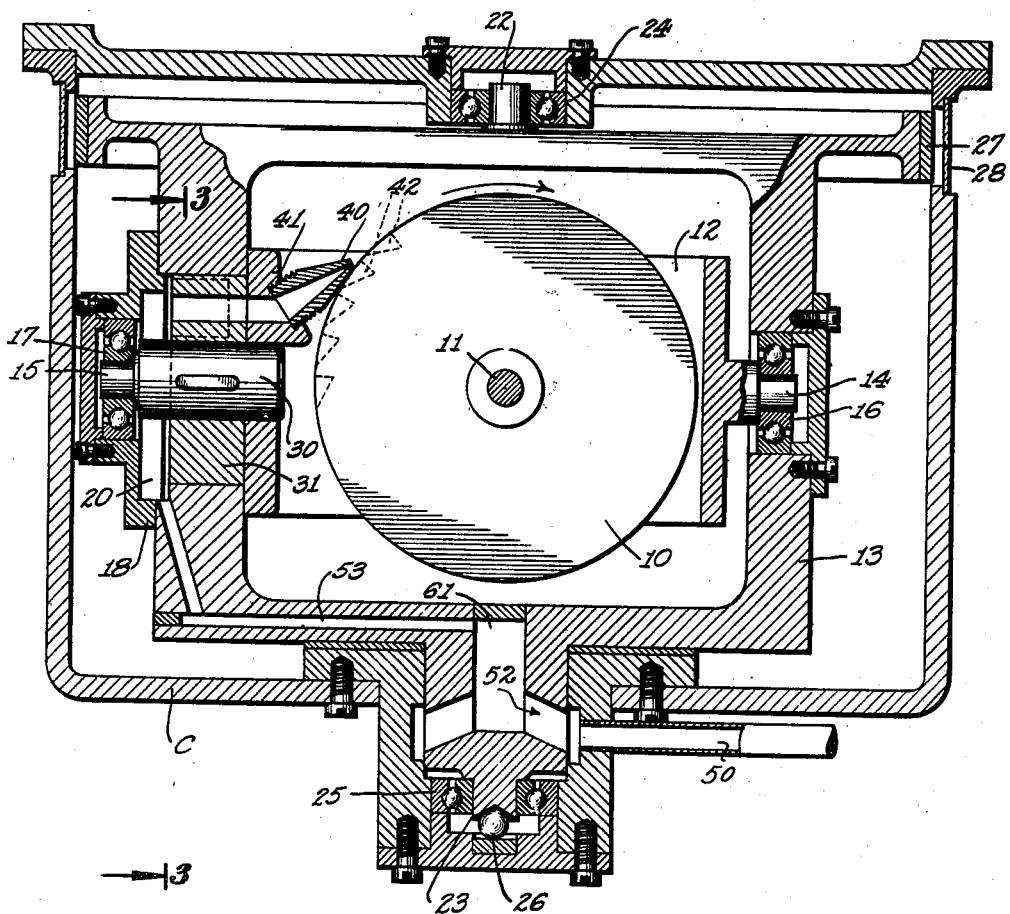
Fig. 1 is a vertical section through a directional gyro showing my invention applied thereto.
Figure 2:
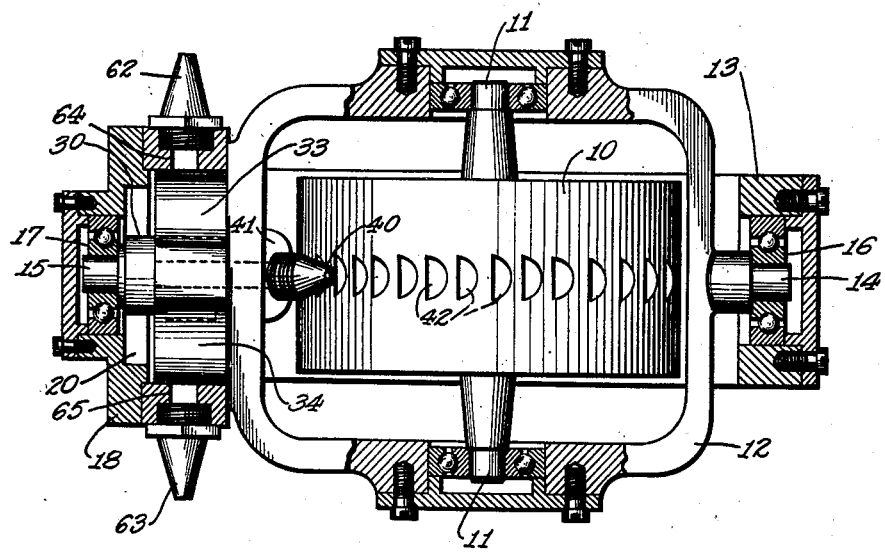
Fig. 2 is a section taken substantially on the line 2—2 of Fig. 1.
Figure 3:
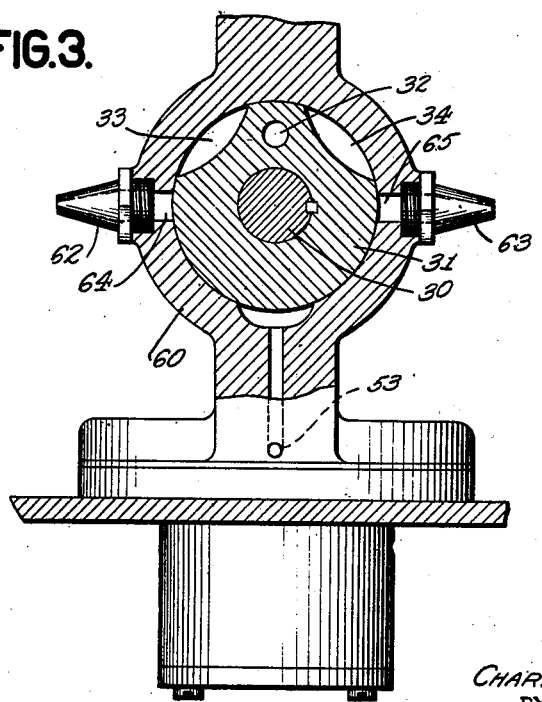
Fig. 3 is a section taken substantially on the line 3—3 of Fig. 1.

Referring to the drawings, I have shown my invention as applied to a directional gyro, but it will become apparent and will also be pointed out hereinafter that the invention has more general application. The essentials of this instrument are similar to those of other instruments in which a non-pendulous gyro is supported for three degrees of freedom. Thus, in the directional gyro shown, a gyro rotor 10 is journaled at diametrically opposite points 11 in an inner frame 12, which in this instance takes the form of a ring. The spinning axis of the gyro constitutes the first degree of freedom thereof. The second degree of freedom of the gyro is obtained by pivotally mounting the ring or frame 12 within an outer ring or frame 13 by means such as a trunnion 14 at one side of ring 12, and a trunnion 15 at the other side of said ring supported in bearings 16 and 17. The bearing 16 is carried directly within the ring 13, but the bearing 17 is carried by means of a cap 18 fixed to the frame 13 so as to provide a space 20 between the cap and said ring for a purpose to be described hereinafter. The third degree of freedom is formed by mounting the outer ring or frame 13 within the casing C by means of trunnions 22, 23 supported in bearings 24, 25 and a thrust bearing 26. The pivotal axis of movement of the outer ring 13 is at an angle to the pivotal axis of movement of inner ring 12, in this instance at right angles thereto, and the two axes are contained in the same plane. The gyro is adapted to stabilize the outer ring 13 in its plane and therefore said outer ring may carry an index ring 27 cooperating with any suitable index on the transparent opening 28 in the front wall of the casing C. Since the ring 13 will maintain its plane in space, any movements of a craft on which the instrument is mounted will carry the casing C fixed to the craft therewith and hence the index carried on the transparent window of casing C will move around the peripheral scale 27 to give an indication of change of direction.

The means for driving the rotor 10 and for causing said rotor to erect itself may consist of an enlarged trunnion portion 30 formed on the inner ring 12 adjacent its supporting trunnion 15, and upon said trunnion portion 30 there may be mounted a collar 31 having various passages 32, 33, 34 formed therein. The outer face of said collar 31 forms one wall of the chamber 20, the other walls of which are formed by the cap 18. The valve passage 32 communicates at one end with the chamber 20 and extends through the collar 31 parallel to the axis 14, 15 and communicates at its other end with a nozzle 40 tapped into a nut 41 on the trunnion portion 30. If air under pressure is supplied to chamber 20, it will pass through the passage 32 to the nozzle 40 which is positioned adjacent the periphery of gyro rotor 10 in such manner as to cause the fluid under pressure to discharge into buckets 42 formed in the periphery of the rotor and thus drive the gyro rotor at high speed. Fluid under pressure such as compressed air may be delivered to chamber 20 from an air supply 50 either by an external pipe or by a passage 52 formed in the lower trunnion of outer ring 13 and continuing through the wall of the ring in a passage 53 which communicates with chamber 20. As the gyro axis 11 tilts, and therefore as the inner ring 12 tilts, around the axis 14, 15, with respect to the outer ring 13, the supply of fluid under pressure to the nozzle is not interrupted in any instance because the passage 32 within the sleeve 31 is in engagement with chamber 20 throughout the complete revolution of the said ring 12 with respect to the outer ring 13.

Should the gyro and its inner supporting ring 12 become tilted for some reason such as the rotation of the earth beneath the gyro or friction in the bearings of the gyro rotor axis, or for some other cause, the angle which the gyro rotor axis makes with the plane of ring 13 will become less than 90° and thus the stabilizing effect of the gyro upon said outer ring will be lessened until a point is reached where the gyro becomes ineffective to provide sufficient stabilization. It is therefore desired to provide means for restoring the gyro to its original effective position whenever said gyro tends to become inclined with respect to the outer frame. For this purpose I utilize the passages 33 and 34 which extend inwardly within the collar 31 along the axis 14, 15 to a predetermined point but not through said collar. The ring 13 is provided with a yoke 60 forming a bearing for the collar 31. The air passage 53 extends through said ring 13 into said yoke portion at 61. The said yoke on the ring 13 carries a pair of nozzles 62 and 63 at the outer ends of ports 64 and 65 extending through the yoke to the collar 31. The valve passages 33 and 34 are so positioned that they terminate adjacent the passages 64 and 65 leading to the nozzles 62 and 63. When, therefore, the gyro tilts, carrying ring 12 and therefore sleeve 31 therewith, one passage 33 or 34, depending upon the direction of tilt of the gyro, will come into communication with its respective passage 64, 65 to cause the fluid under pressure from chamber 20 to discharge through nozzle 62 or 63. The discharge of fluid under pressure from one of said nozzles 62 or 63 creates a reaction pressure which is applied around the pivotal axis 22, 23 of the outer ring 13, and in accordance with the fundamental principle of the gyro this will cause movement, not of the ring 13 around the pivotal axis 22, 23, but of the ring 12 around the axis 14, 15. The application of the forces, when the gyro is rotating in the direction indicated by the arrow, is such that the precessional force around the axis 14, 15 will be in such direction as to restore the gyro to its original position.

It has heretofore been proposed to utilize for the purpose hereinbefore described, a plurality of jets which blow continuously from a pair of nozzles against members carried by the second frame. This results in several disadvantages which the present invention has remedied. Briefly, these disadvantages are as follows:

1. The continuous blowing of jets against the second frame means that these jets must be initially carefully balanced and that such balance must be maintained. Such balance is not required in the present invention where the source of fluid pressure is normally disconnected from the discharge or reaction nozzles.

2. Where jets of air are constantly issuing, such jets are obtained from the casing in which the gyro rotor is being driven, and the amount of air which issues continuously from the jets reduces the driving power for the gyro and thus reduces the efficiency of the mechanism. In the present invention the full power for driving the gyro is obtained at all times except in those intervals when the frames have been displaced sufficiently for fluid pressure to discharge through the nozzles.

3. Where jets were used in former devices and air under pressure was constantly discharging therefrom, it was not possible to have these jets very far removed from the gyro casing, for constructional reasons. Therefore the amount of torque which could be obtained by the force of the jets was limited. In the present invention the reaction nozzles, being carried by the outer frame, can be positioned as far as desired from the pivotal axis of the outer frame and therefore more torque is obtained for a given air flow from the nozzle.

The sensitivity of response of the self-erection arrangement described above may be controlled by the position of the ends of passages 33 and 34 with respect to nozzle passages 64 and 65. If the passages 33 and 34 are so positioned that a very slight tilting movement of the gyro will bring one of said passages into communication with the respective passage 64, 65, then a very sensitive response is obtained and the gyro will be maintained close to its original position. However, such sensitivity may for some reason be undesirable and since the efficiency of stabilization of the gyro is not appreciably affected by a small degree of tilt away from the position where its axis is at right angles to the plane of outer frame 13, the passages 33, 34 may be positioned with their ends removed from the passages 64, 65 by any predetermined amount so that a given amount of tilt of the gyro axis will take place before the erecting mechanism becomes operative. In the latter case, the gyro may not be restored to its full 90° relationship of its spinning axis with respect to the plane of the outer ring, but this will nevertheless provide sufficient stabilization.

While the invention has been described in connection with a directional gyro in which the gyro is mounted for rotation about a horizontal spinning axis, the invention applies broadly to other gyroscopic instruments where the gyro spinning axis is at a different angle, as, for instance, where it is vertical as in the case of an artificial horizon. Also, the invention is not limited to inner and outer rings mounted on pivotal axes at right angles to one another but applies where the relationship of these axes is some other angle. Also, the source of power for erecting the gyro need not necessarily be pneumatic but may be some other type. The broad idea which is involved in all of these different forms is that of a nonpendulous gyro supported for three degrees of freedom, said support including relatively movable rings or frames, a source of power for erecting the gyro, and said source of power controlled solely by the relative displacement of the rings of said support without depending upon auxiliary mechanism such as pendulums.

In accordance with the provisions of the patent statutes, I have herein described the principle and operation of my invention, together with the apparatus which I now consider to represent the best embodiment thereof, but I desire to have it understood that the apparatus shown is only illustrative and that the invention can be carried out by other equivalent means. Also, while it is designed to use the various features and elements in the combination and relations described, some of these may be altered and others omitted without interfering with the more general results outlined, and the invention extends to such use.

Having described my invention, what I claim and desire to secure by Letters Patent is:

1. In a gyroscopic instrument comprising a non-pendulous gyro, a frame in which said gyro is journaled for rotation, a second frame in which said first frame is pivotally mounted, a fixed support in which said second frame is pivotally mounted for movement about an axis at an angle to the pivotal axis of said first frame and to the rotational axis of said gyro, means for applying torques in either direction around the pivotal axis of mounting of said second frame, said means including a source of fluid pressure, a plurality of nozzles carried by said second frame and positioned so as to discharge on opposite sides of the pivotal axis of said second frame in a plane at an angle thereto and means whereby said fluid pressure is normally disconnected from said nozzles, and means whereby the connection of said fluid pressure to said nozzles is selectively controlled solely by the relative displacement of said first and second frames.

2. In a gyroscopic instrument comprising a non-pendulous gyro, a frame in which said gyro is journaled for rotation, a second frame in which said first frame is pivotally mounted, a fixed support in which said second frame is pivotally mounted for movement about an axis at an angle to the pivotal axis of said first frame and to the rotational axis of said gyro, means for applying torques in either direction around the pivotal axis of mounting of said second frame, said means including a source of fluid pressure, a plurality of reaction nozzles carried by said second frame and positioned so as to discharge on opposite sides of the pivotal axis of said second frame in a plane at an angle thereto, said source of fluid pressure being normally disconnected from said nozzles, and means whereby the connection of said fluid pressure source to said nozzles is selectively controlled solely by the relative displacement of said first and second frames.

CHARLES B. ROEDE.